(12) United States Patent
Laudadio et al.

(10) Patent No.: US 11,771,218 B2
(45) Date of Patent: *Oct. 3, 2023

(54) SYSTEMS AND METHODS FOR AUTOMATICALLY DIRECTING A HEIGHT ADJUSTABLE DESK BASED ON A PLURALITY OF SENSORS

(71) Applicant: Versa Products Inc., Los Angeles, CA (US)

(72) Inventors: Christopher Laudadio, Los Angeles, CA (US); Aryan Jafari, Los Angeles, CA (US)

(73) Assignee: Versa Products Inc., Los Angeles, CA (US)

(*) Notice: Subject to any disclaimer, the term of this patent is extended or adjusted under 35 U.S.C. 154(b) by 38 days.

This patent is subject to a terminal disclaimer.

(21) Appl. No.: 17/357,236

(22) Filed: Jun. 24, 2021

(65) Prior Publication Data

US 2021/0315377 A1 Oct. 14, 2021

Related U.S. Application Data

(63) Continuation of application No. 16/514,975, filed on Jul. 17, 2019, now Pat. No. 11,058,217, which is a continuation of application No. 16/107,482, filed on Aug. 21, 2018, now Pat. No. 10,405,647.

(60) Provisional application No. 62/547,958, filed on Aug. 21, 2017.

(51) Int. Cl.
A47B 21/02 (2006.01)
A47B 21/04 (2006.01)
F16M 11/00 (2006.01)
A47B 21/03 (2006.01)

(52) U.S. Cl.
CPC .............. *A47B 21/02* (2013.01); *A47B 21/04* (2013.01); *F16M 11/00* (2013.01); *A47B 2021/0364* (2013.01); *A47B 2200/004* (2013.01); *A47B 2200/0076* (2013.01)

(58) Field of Classification Search
CPC ...................................................... A47B 21/02
See application file for complete search history.

(56) References Cited

U.S. PATENT DOCUMENTS

| 5,224,429 A * | 7/1993 | Borgman | A47B 17/033 248/188.4 |
| 9,921,726 B1 * | 3/2018 | Sculley | A47B 83/001 |

(Continued)

*Primary Examiner* — Suresh Suryawanshi
(74) *Attorney, Agent, or Firm* — Marin Patents LLC; Gustavo Marin

(57) ABSTRACT

Systems and methods for adjusting position and/or orientation of a height adjustable desk are disclosed. The system receives data from one or more sensors, comprising sit and stand periods associated with a user of the height adjustable desk. The system further calculates a physical condition profile for the user, based on a pre-configured set of rules obtained by a network-connected health application. The physical condition profile is based on the sit and stand periods associated with the user. Further, the system creates a sit and stand schedule for the user based on the calculated physical condition profile and transmits a signal to an electric motor connected with the height adjustable desk, to adjust the height of height adjustable desk according to the sit and stand schedule.

20 Claims, 13 Drawing Sheets

(56) References Cited

U.S. PATENT DOCUMENTS

| | | | | |
|---|---|---|---|---|
| 2014/0096706 A1* | 4/2014 | Labrosse | .............. | G05B 19/048 |
| | | | | 108/21 |
| 2014/0137773 A1* | 5/2014 | Mandel | ................ | G06Q 10/109 |
| | | | | 108/50.11 |
| 2014/0208985 A1* | 7/2014 | DesRoches | .......... | A47B 13/081 |
| | | | | 108/20 |
| 2016/0260019 A1* | 9/2016 | Riquelme Ruiz | ...... | G06N 20/00 |
| 2017/0135587 A1 | 5/2017 | Desroches | | |

* cited by examiner

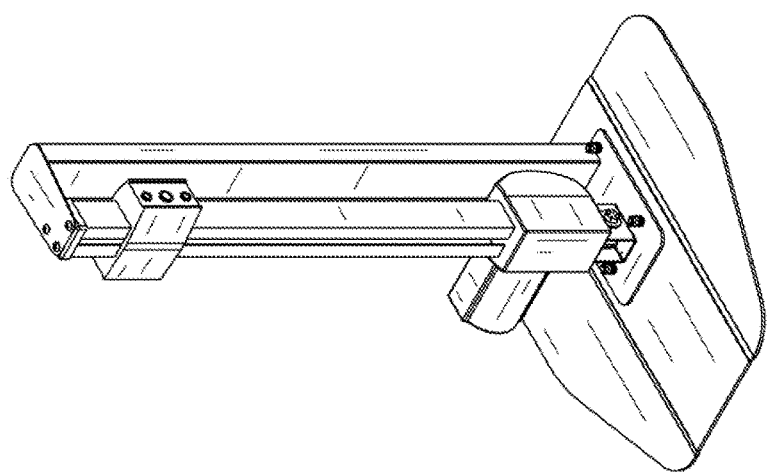
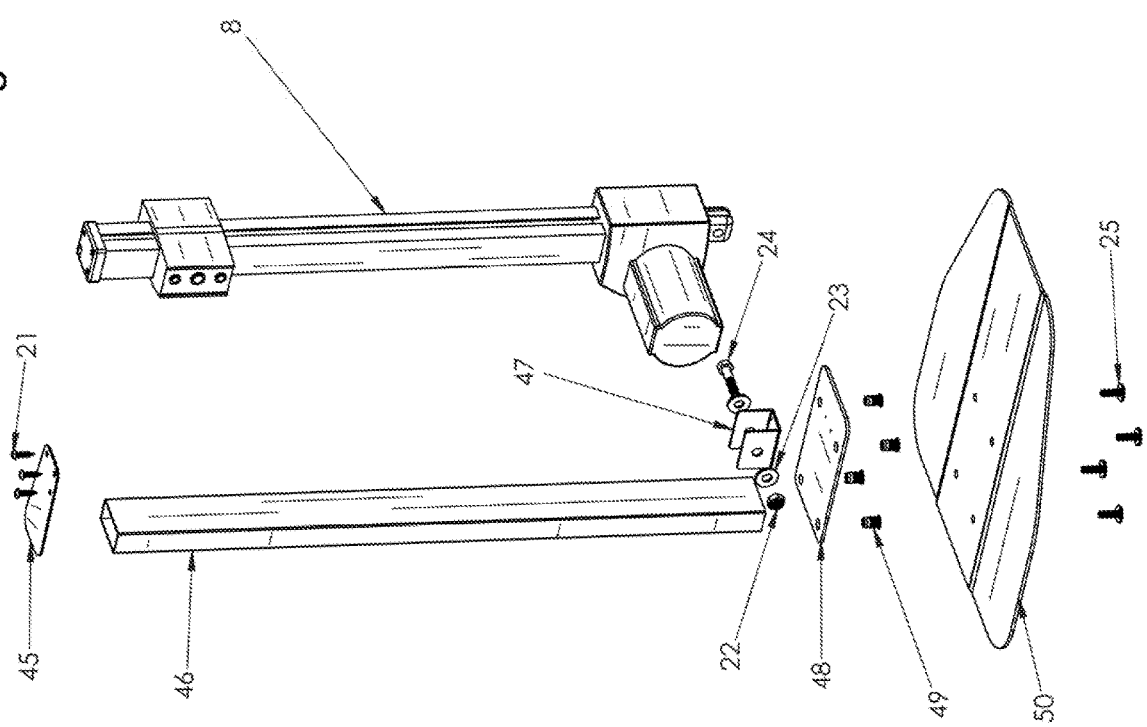
Fig. 7

SYSTEMS AND METHODS FOR AUTOMATICALLY DIRECTING A HEIGHT ADJUSTABLE DESK BASED ON A PLURALITY OF SENSORS

CROSS-REFERENCE TO RELATED APPLICATIONS

This application claims the benefit of, and priority to, U.S. Nonprovisional patent application Ser. No. 16/514,975 entitled "COMPACT, MOTORIZED, HEIGHT-ADJUSTABLE, SOFTWARE-CONTROLLED DESKTOP SYSTEM," filed Jul. 17, 2019, which claims the benefit of, and priority to, U.S. Nonprovisional patent application Ser. No. 16/107,482 filed Aug. 21, 2018 entitled "COMPACT, MOTORIZED, HEIGHT-ADJUSTABLE, SOFTWARE-CONTROLLED DESKTOP SYSTEM," which in turn claims priority to U.S. Provisional Patent Application Ser. No. 62/547,958 filed on Aug. 21, 2017, entitled, "COMPACT, MOTORIZED, HEIGHT-ADJUSTABLE DESKTOP SYSTEM", the entire specifications of which are incorporated herein by reference.

BACKGROUND OF THE INVENTION

Field of the Art

The disclosure relates to computer furniture, in particular, to a compact motorized, height-adjustable software-controlled desktop or a motorized standing desk converter.

Discussion of the State of the Art

As the computer has become a centerpiece of work and other daily activities, there has become a need for height-adjustable computer furniture, in particular, a furniture system that allow for a user to go from a sitting position in front of a computer to a standing position in front of a computer with ease. It has been shown that sitting for long periods of time can be harmful to one's heath. As such, these systems allow for a user to continue to use a computer while changing his/her position from standing from sitting, alleviating back pain commonly attributed to sitting for long periods, for example.

In order to convert computer furniture from a position in which a user is sitting to a position in which a user is standing, various lift mechanisms have been used. One example is a manual, spring-assisted lift mechanism. However, such a manual mechanism requires a user to lift the portion of the desktop, a desktop which often has heavy computer equipment thereon. General examples of older systems include those disclosed in U.S. Pat. No. 5,868,079 and U.S. Patent Publication No. 2008/0203865

Accordingly, there is a need for an improved, computer-controlled, height-adjustable desktop system that allows a user to achieve a desired desktop height without manual adjustment. Moreover, as workspaces have become smaller, there is a need for a simple, minimalistic design that allows the desktop system to be used in smaller spaces.

SUMMARY OF THE INVENTION

Accordingly, the inventor has conceived and reduced to practice, in a preferred embodiment of the invention, a compact motorized, height-adjustable software-controlled desktop or a motorized standing desk converter.

According to a preferred embodiment of the invention, A compact sit-stand workstation that easily rests on top of an existing desk, giving a user the ability to sit or stand while working in front of a computer is provided. The workstation has an easy push-button electric height adjustment that allows the workstation to vary in height. A keyboard tray can hold a keyboard and mouse, while the rest of a user's desk can remain free for other objects. The keyboard tray has a durable design. Various monitor sizes can be used with this system and allows or tilt and swivel adjustment of the monitor.

The desktop system in accordance with the present invention generally comprises a base plate, a keyboard tray, and a monitor mount assembly. An electric motor allows the keyboard tray and monitor mount assembly to move up and down (away and toward the base plate).

The desktop system is unique in that it is compact and space-saving. In particular, the overall width of the system does not exceed the width of the keyboard tray. The width of the base is indeed smaller than the width of the keyboard. The durable steel sheet metal used allows this structure to remain stable despite its compact nature.

The base is trapezoid-like shaped, having a front edge, rear edge, right lower and upper edges and left lower and upper edges. Front and rear edges are generally parallel, and right and left upper edges are generally parallel. Right and left lower edges taper in toward front edge. Front edge is shorter than rear edge, creating a trapezoid-like shape.

Connected to the base plate is the electric motor and vertical tube that allows the keyboard tray and monitor mount assembly to move up and down.

Keyboard tray can slide in and out toward a user along fold down edge guides provided along a flange, paralleling the base plate. A designated slot hole is also provided in the flange to limit the pull-out travel of the keyboard.

Monitor attachment plate is attached to a connector bracket that can move the monitor mount assembly up and down along guides. The monitor attachment plate can rotate in place. T-knobs are used to tighten and adjust a desirable position on the guides Benefits of this system include, but are not limited to, its electric, vertical height adjustment capability, thin, space-saving design, durability and ergonomic and fatigue-reducing properties.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

FIG. 7 is a further diagram illustrating components of a compact sit-stand workstation, according to a preferred embodiment of the invention.

DETAILED DESCRIPTION

Figure 1:
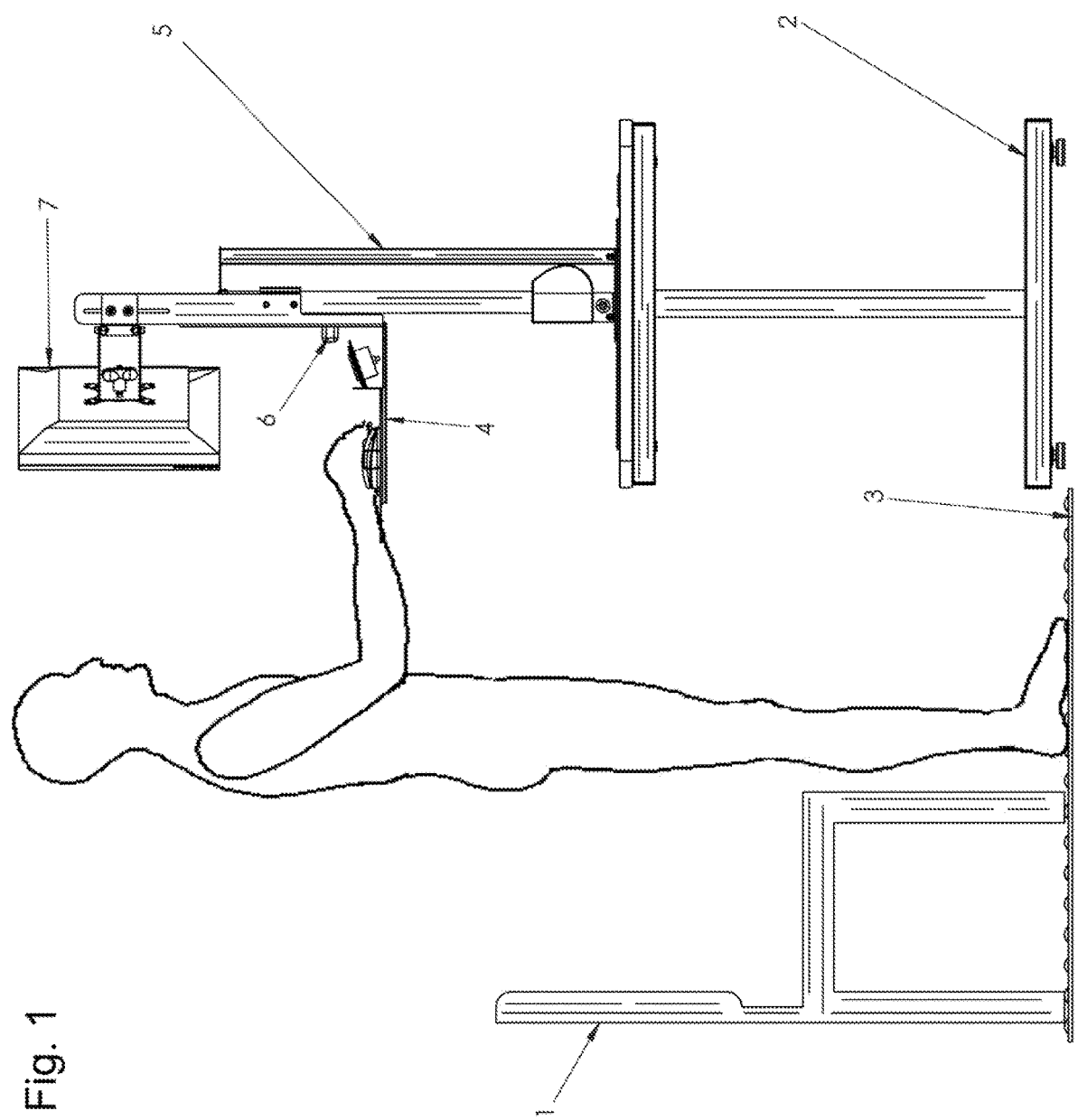
FIG. 1 is a diagram of a user interacting with a compact sit-stand workstation that easily rests on top of an existing desk and is raised to a standing-height position, according to a preferred embodiment of the invention.

The inventor has conceived, and reduced to practice, a compact motorized, height-adjustable software-controlled desktop or a motorized standing desk converter.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

FIG. 1 is a diagram of a user interacting with a compact sit-stand workstation that easily rests on top of an existing desk and is raised to a standing-height position, according to a preferred embodiment of the invention. According to the embodiment, a compact motorized height-adjustable desktop system (interchangeably referred to as a "CMHADS" herein, for brevity) may be used to enable a user to modify the operating height of a table, bench, or desk 2 to accommodate various postures including, but not limited to, seated in a chair 1 at desk 2, or standing upright on the floor, or various possible positions in between fully-seated or fully-standing, or even (in some exemplary arrangements, not shown here for clarity) in a lowered position below the normal height of desk 2 to accommodate sitting on a cushion, futon, or directly on the floor, according to a user's preference. According to various arrangements, a CMHADS may comprise a number of attachments and accessories that affix to or are integrally-formed as a portion of a main body assembly 5. For example, a peripheral tray 4 may be used to provide a tray or surface (optionally parallel with the floor or at an angle to suit a user's preference) for a user to place a keyboard, mouse, drawing tablet, six-degree-of-freedom controller, gaming controller, or any other computing input peripherals or similar devices. A monitor attachment 7 may be used to provide mounting options for one or more display monitors, so that a user may position and adjust their viewing angles or number of screens in use to suit their preference. For example, dual monitors may be mounted to a dual-monitor attachment 7 (as shown below in FIG. 3) and their individual position and tilt may be adjustable, as well as the angle or spacing between the separate monitors, or the tilt of an assembly overall (that is, a mounted pair of monitors may be tilted as a single assembly such that the displays remain in-line with one another, as opposed to tilting individually which would cause the spacing and alignment between the monitors to differ from top to bottom). Additionally, a plurality of sensors or connected devices may be affixed to, or used in combination with, CMHADS 5, such as (for example, including but not limited to) a presence sensor and calculation unit 6 that may detect the presence of a user (or optionally may detect, measure, monitor, or record additional data such as a user's posture, physical characteristics, behavior or other observable information), or a weight sensor 3 that a user may stand upon to measure their weight or weight distribution (which may then be used to detect, measure, monitor, or record the user's posture or movements).

Figure 2:
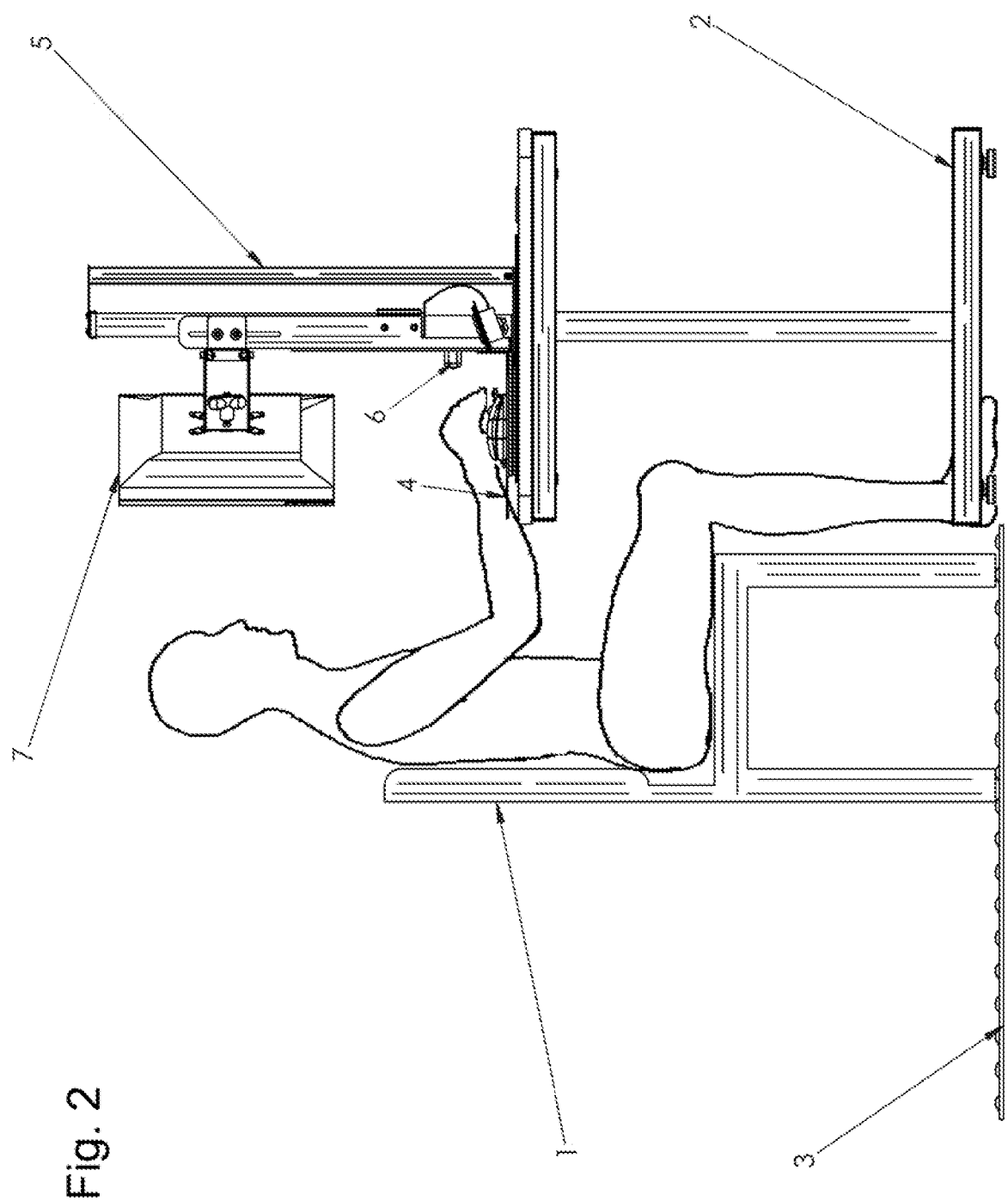
FIG. 2 is a diagram of a user interacting with a compact sit-stand workstation that easily rests on top of an existing desk and is lowered to a seated-height position, according to a preferred embodiment of the invention.

FIG. 2 is a diagram of a user interacting with a compact sit-stand workstation that easily rests on top of an existing desk and is lowered to a seated-height position, according to a preferred embodiment of the invention. In a seated-height position, a CMHADS 5 may provide mounting options for computer peripherals or accessories (such as monitor mounting assembly 7 or peripheral tray 4), sensors and connected devices (such as presence sensor and calculation unit 6), or other capabilities to expand the functionality of a table, bench, desk, or other work surface 2. When seated upon a bench, stool, or chair 1, a weight sensing mat 3 may also be employed (and optionally calibrated to accommodate the use of chair 1) to detect, measure, monitor, or record the user's weight, weight distribution, posture, or movements while seated. For example, by detecting small changes in the weight distribution of the seated user, their posture and movements at the desk 2 may be derived through analysis of the sensor data, and optionally may be transmitted to software applications or hardware devices such as fitness trackers or push notifications on the user's phone or computing device, so that the user may be given feedback such as coaching on their posture, or reminders to stand up and move about after being seated for some time, or other such implementations.

Figure 3:
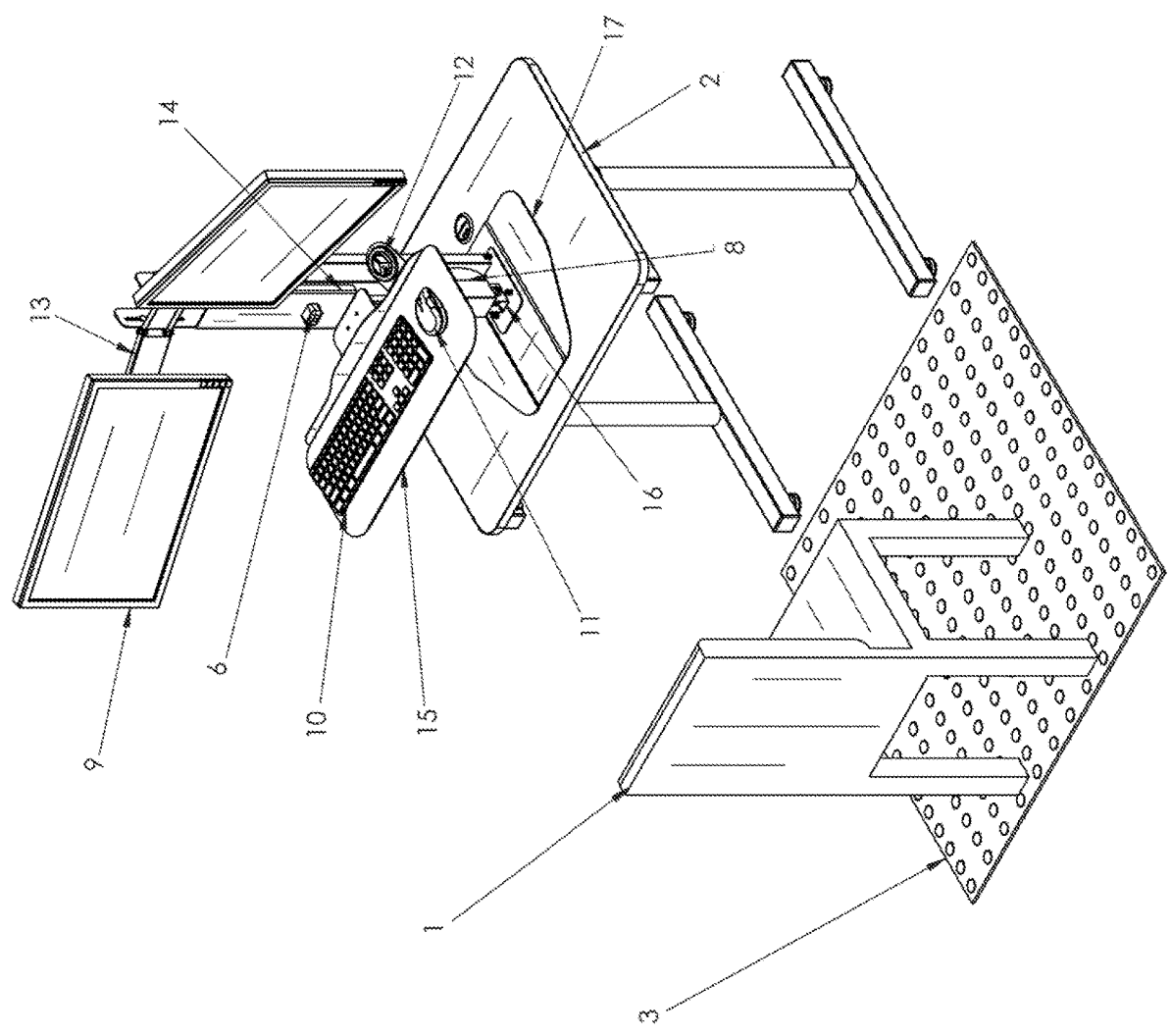
FIG. 3 is a diagram illustrating components of a compact sit-stand workstation, according to a preferred embodiment of the invention.

FIG. 3 is a diagram illustrating components of a compact sit-stand workstation, according to a preferred embodiment of the invention. According to the embodiment, a CMHADS may comprise a number of accessories and peripherals affixed to, integrally-formed as a portion of, or used in combination with, a table, bench desk or other work surface 2 or a CMHADS main body 5 (not shown here for clarity but shown previously in FIGS. 1-2). A monitor attachment assembly 13 may be used to mount one or more computer display monitors 9 and may provide a number of adjustments such as (for example, including but not limited to) individual or combined height, tilt, angle, or rotation, as well as optionally providing for adjustment of spacing or angle between each of multiple monitors when mounted. A keyboard tray assembly 15 may provide a surface or tray for a user to place input devices or other peripherals such as (for example, including but not limited to) a keyboard 10 or mouse 11 (or Input devices 270), and may also serve as an additional location for affixing or integrating additional devices, sensors, or controls such as a hand-operated switch control assembly 12 for adjusting the height or other aspects of the adjustable workstation, or that may interface with a computing device (such as via a standardized input/output port such as USB) to interact with software or hardware or direct programmable functions such as user-defined macros or shortcuts. Height or other aspects of CMHADS may be controlled and actuated using an adjustable structure 17 with an affixed or integrated piston, motor, or other actuator 8 for raising, lowering, tilting, rotating, or otherwise adjusting the position or orientation of CMHADS and thus any accessories or peripherals affixed or integrally-formed thereupon. Actuator 8 may be attached or housed within actuator seat assembly 16. For example, a user may use software on computing device or a hand switch control assembly 12 to direct the operation of actuator 8 to raise or lower the height of CMHADS so that mounted monitors 9 are at a desirable viewing level or angle, or may direct actuator 8 to adjust the height between the bottom plate 50 (referring to FIG. 7) and main body 5.

Figure 4:
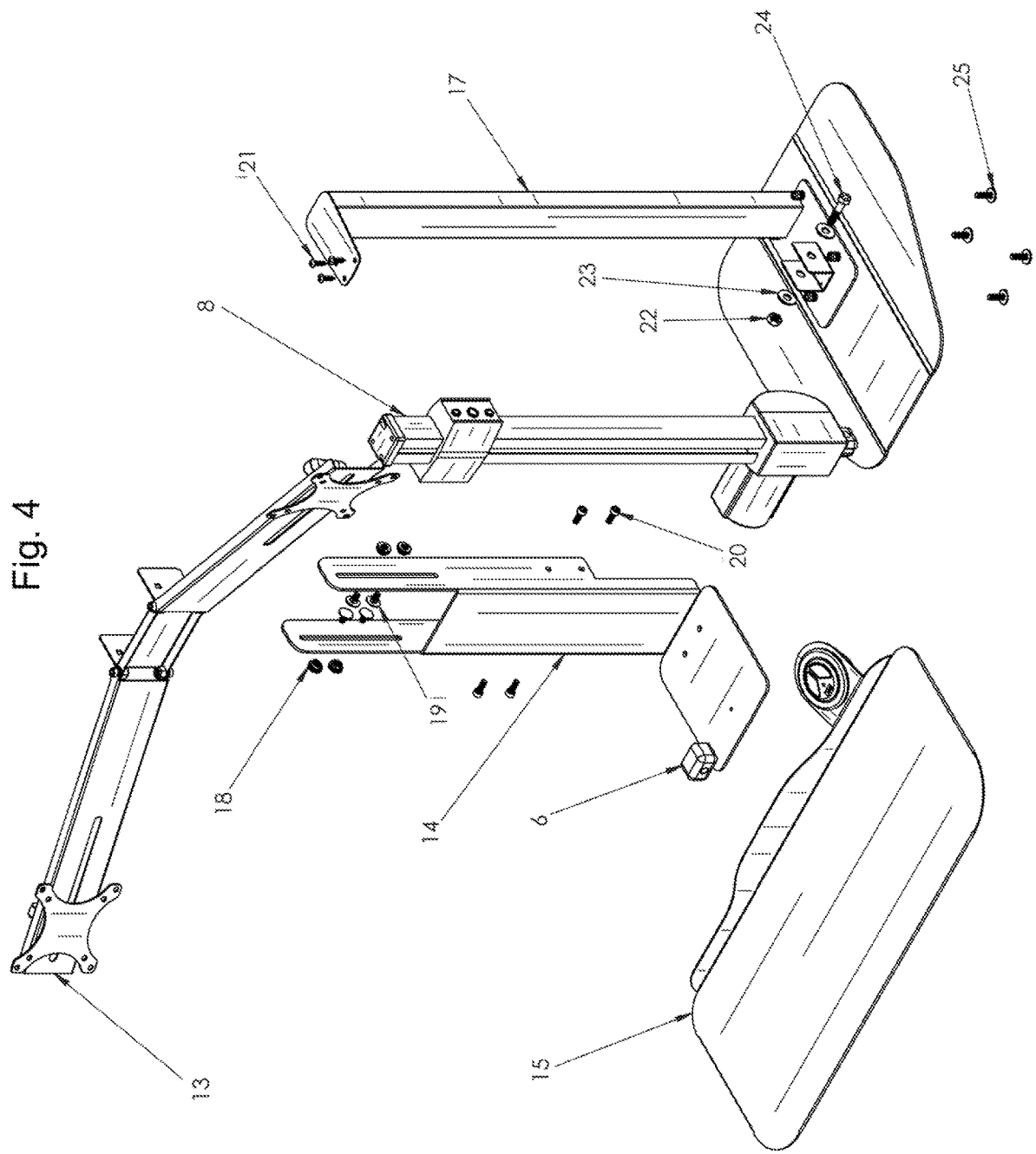
FIG. 4 is a further diagram illustrating components of a compact sit-stand workstation, according to a preferred embodiment of the invention.

FIG. 4 is a further diagram illustrating components of a compact sit-stand workstation, according to a preferred embodiment of the invention. According to the embodiment, a CMHADS may comprise a number of hardware components and sub-assemblies for assembly and operation, that may be interchangeable or configurable to provide specific features or variations according to a user's preference (for example, providing mounting options for additional monitors or specific computer peripherals). For the sake of clarity, reference may be made herein to specific hardware arrangements of components that may be configured for alternate arrangements, such as reference to a dual-monitor mount assembly 13. It should be appreciated that while reference may be made to such a specific arrangement, these arrangements are exemplary and not limiting in scope, as it will be readily understood that alternate configurations may be utilized according to the embodiment, for example utilizing a mount assembly 13 configured for a single monitor or configured for more than two. According to the embodiment, CMHADS may comprise a structure that provides a rigid frame or backbone to which other components may be affixed or integrally-formed for various configurations and operation. An actuator 8 may be affixed to structure 17 using mechanical fixing hardware such as (for example, including but not limited to) a plurality of screws 21, nuts 22, washers 23, and/or bolts 24. A sliding or otherwise movable body bracket 14 may then be affixed to actuator 8 using a plurality of fixing hardware such as a plurality of bolts 20, such that movable body bracket 14 may be moved or oriented by operation of actuator 8. A monitor mount assembly 13 (such as a dual-monitor mount assembly as shown, though configurations may be used that are configured for other numbers or arrangements of monitors) may then be affixed to movable body bracket 14 using fixing hardware such as a plurality of thumb-nuts 18 and carriage bolts 19. A plurality of accessories or peripherals may also be affixed to movable body bracket 14 such that they may be adjusted via actuator 8, for example a keyboard tray assembly 15 or a presence sensor and calculation unit 6. CMHADS may be affixed to a table, bench, desk, or other work surface via a plurality of fixing hardware such as a plurality of low-profile bolts 25, to provide a more stable or permanent workspace arrangement.

Figure 5:
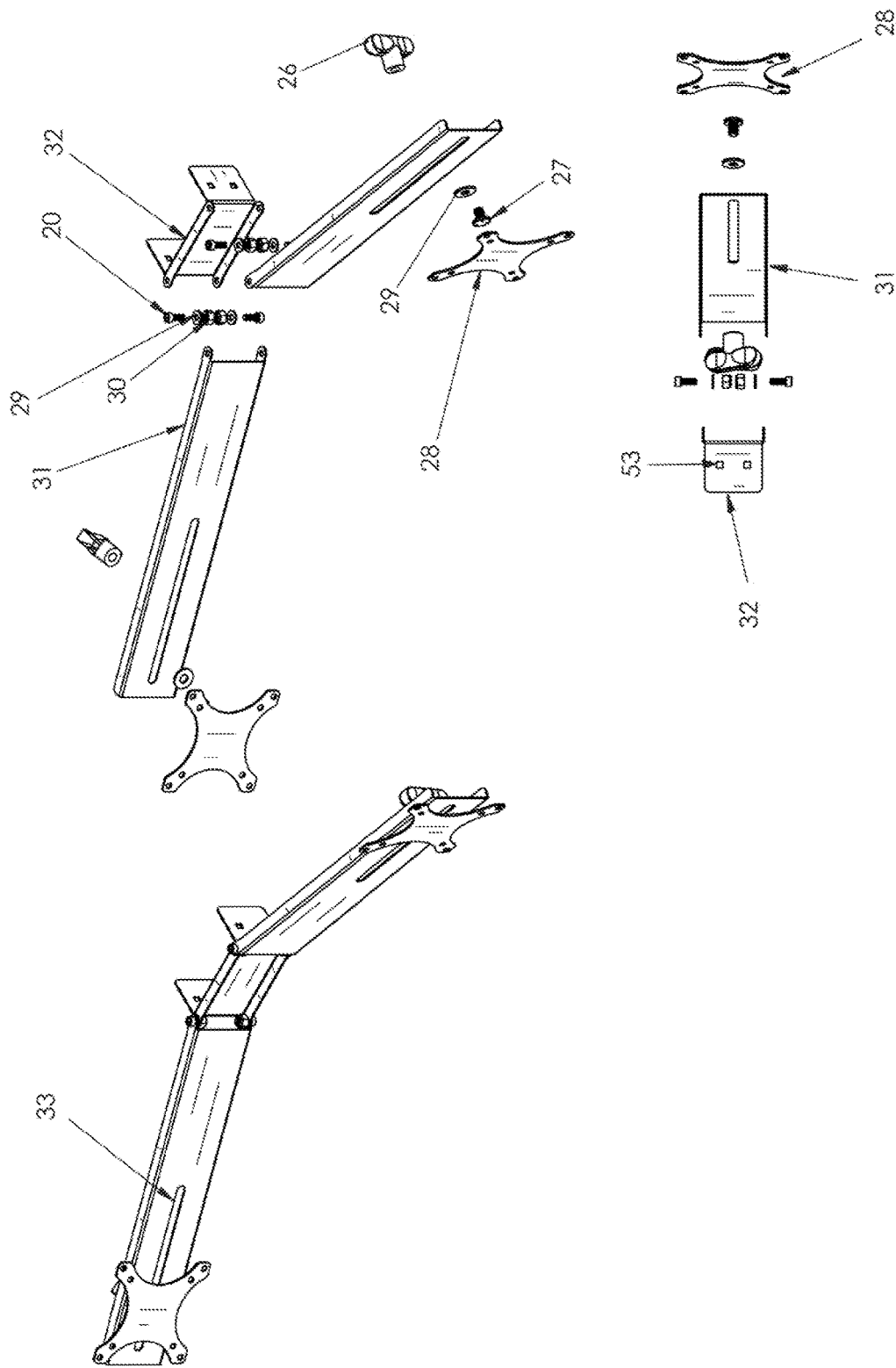
FIG. 5 is a further diagram illustrating components of a compact sit-stand workstation, according to a preferred embodiment of the invention.

FIG. 5 is a further diagram illustrating components of a compact sit-stand workstation, according to a preferred embodiment of the invention. According to the embodiment, a monitor mount assembly 13 may comprise a number of hardware components or sub-assemblies for assembly, configuration, and operation. For example, a plurality of arm brackets 31 may be affixed to an arm joint bracket 32 using fixing hardware such as (for example, including but not limited to) a plurality of bolts 20, washers 29, or nuts 30. Each arm bracket 31 may then be further configured with a mounting plate 28 (such as, for example, a standardized VESA-compliant mounting plate for wide compatibility with computer displays, televisions, and other devices) that may be affixed using, for example, a weld bolt 27, washer 29, and T knob 26 for manual adjustment along a slot 33 configured for positioning mounting plate 28 relative to arm bracket 31. Arm joint bracket 32 may then be affixed to a movable body bracket 14 (as described above, referring to FIG. 4) via a plurality of round or square holes 53 for accommodating fixing hardware such as (for example) a plurality of carriage bolts. This configuration allows for a wide range of adjustment of monitors mounted to assembly 13, including adjustments to the mounting angle of arm brackets 31, position or angle of mounting plates 28, or the position or angle of arm joint bracket 32 relative to a movable body bracket 14. This enables a user to fine-tune the adjustment of their display height, angle, and position to suit their preference or for improved ergonomics.

Figure 6:
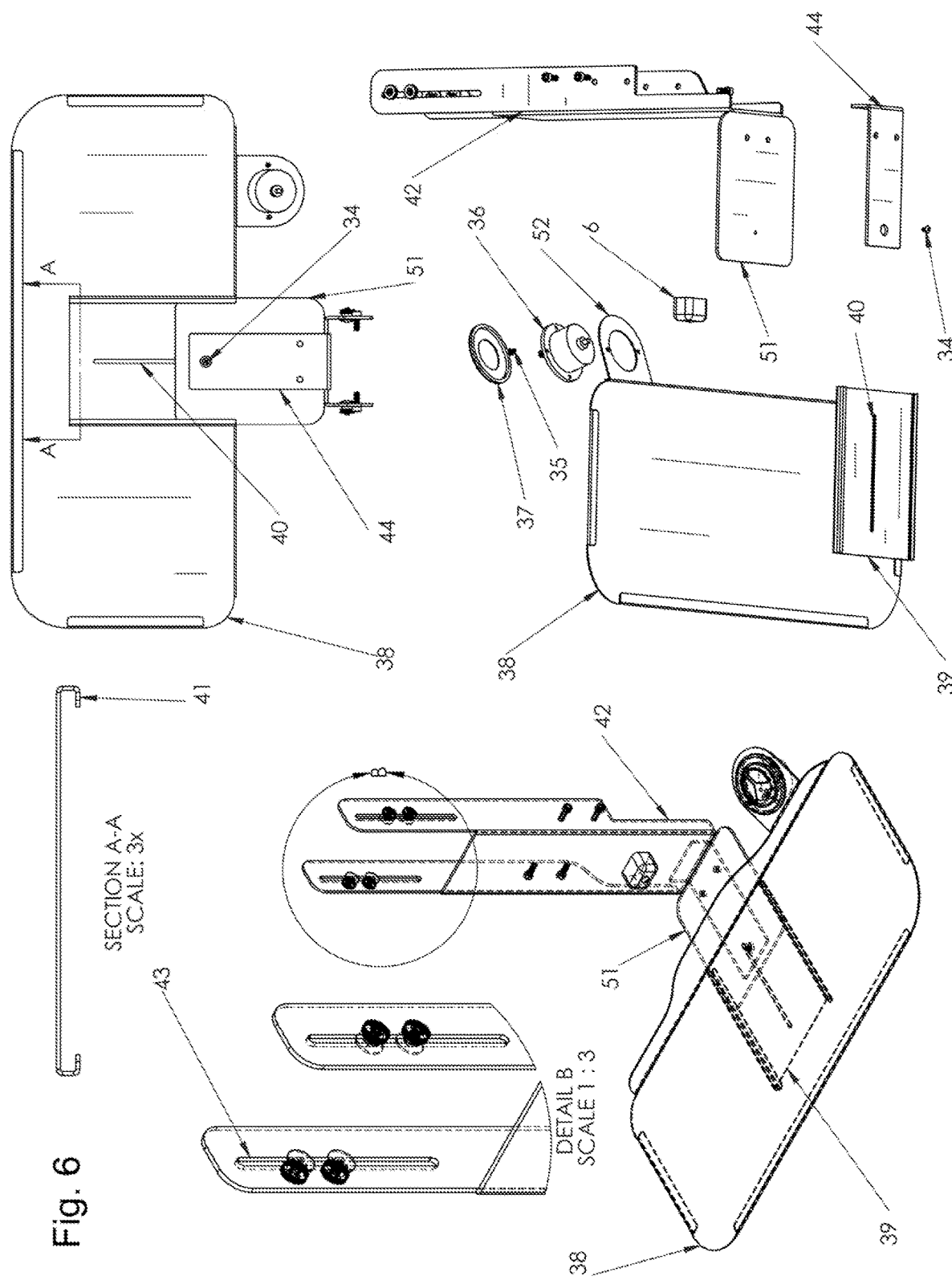
FIG. 6 is a further diagram illustrating components of a compact sit-stand workstation, according to a preferred embodiment of the invention.

FIG. 6 is a further diagram illustrating components of a compact sit-stand workstation, according to a preferred embodiment of the invention. According to the embodiment, a CMHADS may comprise a number of physical dimensions and characteristics suited for a particular configuration or use, in addition to a number of hardware components and sub-assemblies configured to provide desired operation. A keyboard tray 38 may comprise a mounting flange 52 for installation of a hand switch control 36 using fixing hardware such as (for example, including but not limited to) a plurality of mounting bolts 35 and cover 37, so that an installed hand switch control 36 may be firmly affixed to the keyboard tray 38 for reliable operation. Keyboard tray 38 may further comprise shaped physical portions configured to mate with suitably-shaped portions of a CMHADS body, such as using a slide bracket 39 having a U shape 41 for mating to a mounting plate 51 by sliding keyboard tray 38 into place and then fixing with suitable hardware such as (for example) a reinforcing plate 44 and self-tapping screw 34 for fixing in place at a desired position using slot 40 for adjustable positioning of slide bracket 39. As shown in detail B, a monitor mount assembly arm joint bracket 32 may be affixed to CMHADS body 42 using adjustable slots 43 to accommodate a variety of height or angle positioning options, enabling greater adjustability of viewing angles and operation height to suit a user's preference or ergonomic needs (for example, to accommodate users of varying physical proportions, who may require different monitor viewing height or angle while using CMHADS at the same overall height position for seated or standing operation).

FIG. 7 is a further diagram illustrating components of a compact sit-stand workstation, according to a preferred embodiment of the invention. According to the embodiment, an actuator 8 may be affixed to body portions of CMHADS to provide for manual or automatic adjustment of features such as height or angle positioning, by driving mechanical movement of CMHADS components or sub-assemblies. Actuator 8 may be affixed to a bottom plate 50 of CMHADS body using fixing hardware such as (for example, including but not limited to) a plurality of nuts 22, washer 23, or bolts 24 that may pass through a U-shaped bracket 47 to mount actuator 8 to a reinforcing plate 48, which may then be fixed to bottom plate 50 using threaded inserts 49 that may receive bolts 25 to mount CMHADS to a work surface such as a table, bench, or desk. A structural tube 46 may be used to provide a rigid structural backbone for CMHADS and may be affixed to actuator 8 at the top via a top-mounting actuator plate 45 and a plurality of screws 21. When fully assembled, this provides a rigid and adjustable body for CMHADS components and sub-assemblies, wherein adjustment may be made by operation of actuator 8 to direct the position or orientation of various components and sub-assemblies during installation, configuration, or operation.

Control System Architecture

Generally, the techniques disclosed herein may be implemented on computing hardware or a combination of software and computing hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 8:
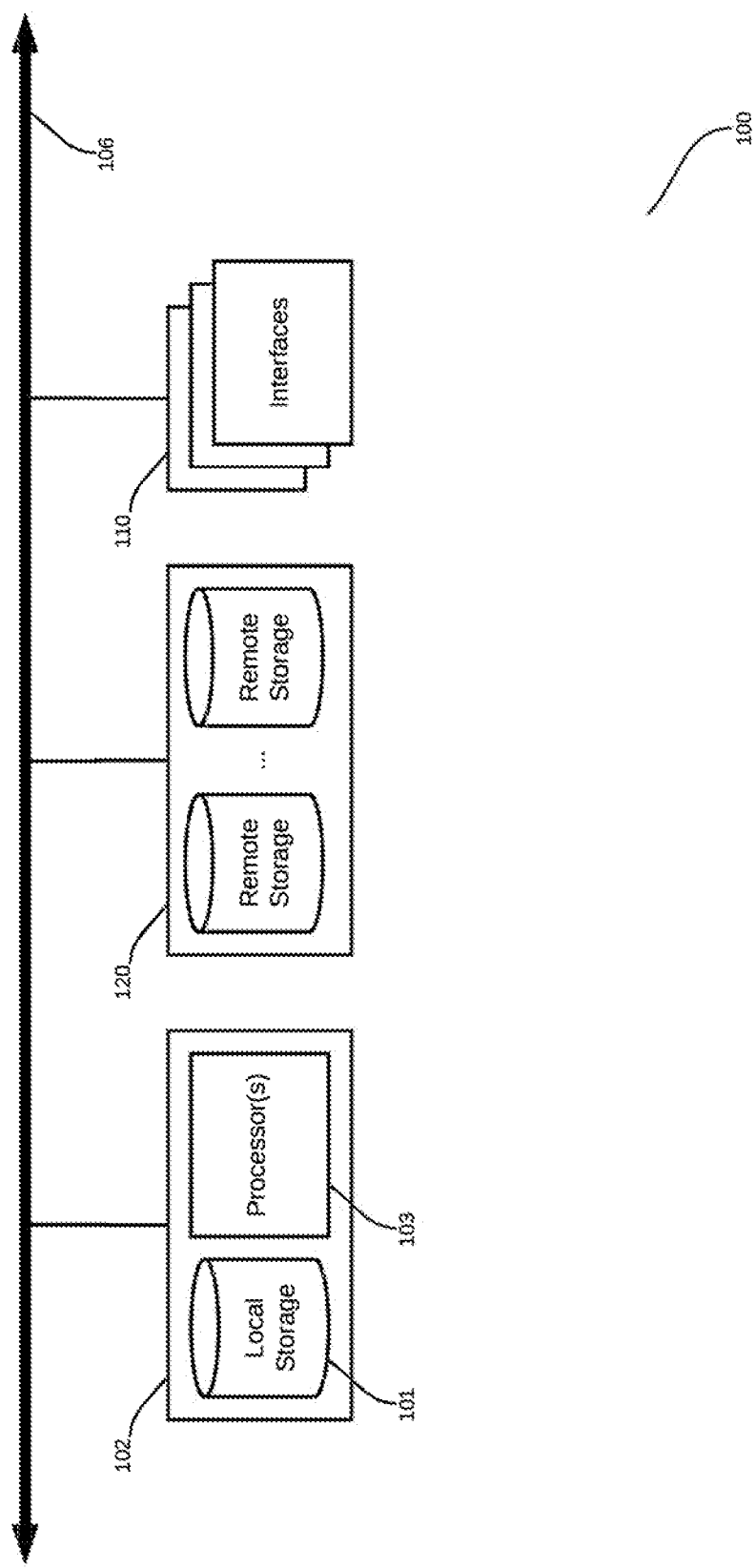
FIG. 8 is a block diagram illustrating an exemplary hardware architecture of a computing device used in an embodiment of the invention.

Referring now to FIG. 8, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (eSATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
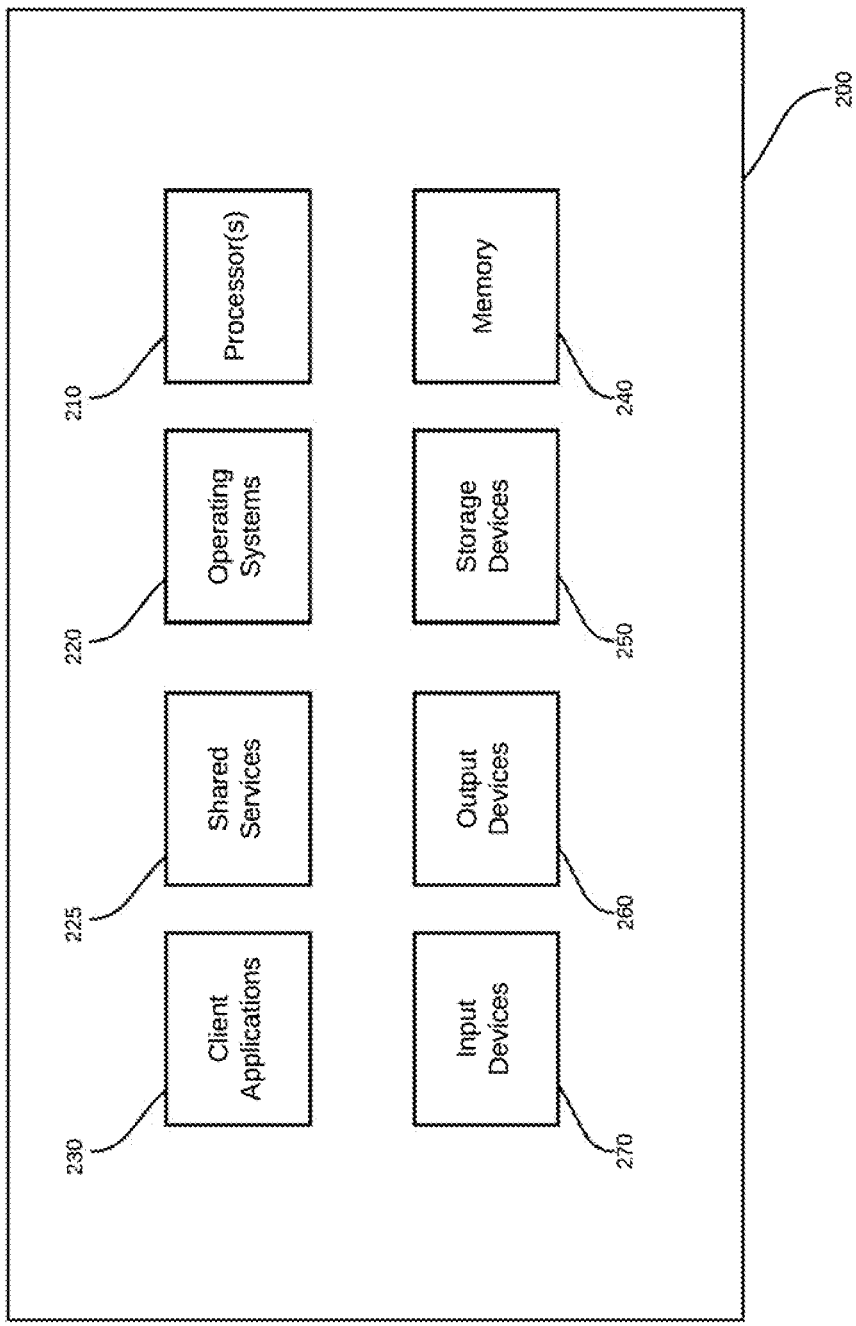
FIG. 9 is a block diagram illustrating an exemplary logical architecture for a client device, according to an embodiment of the invention.

In some embodiments, systems according to the present invention may be implemented on a standalone computing system. Referring now to FIG. 9, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, embedded systems, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 8). Examples of storage devices 250 include flash memory, magnetic hard drive, CD-ROM, and/or the like.

Figure 10:
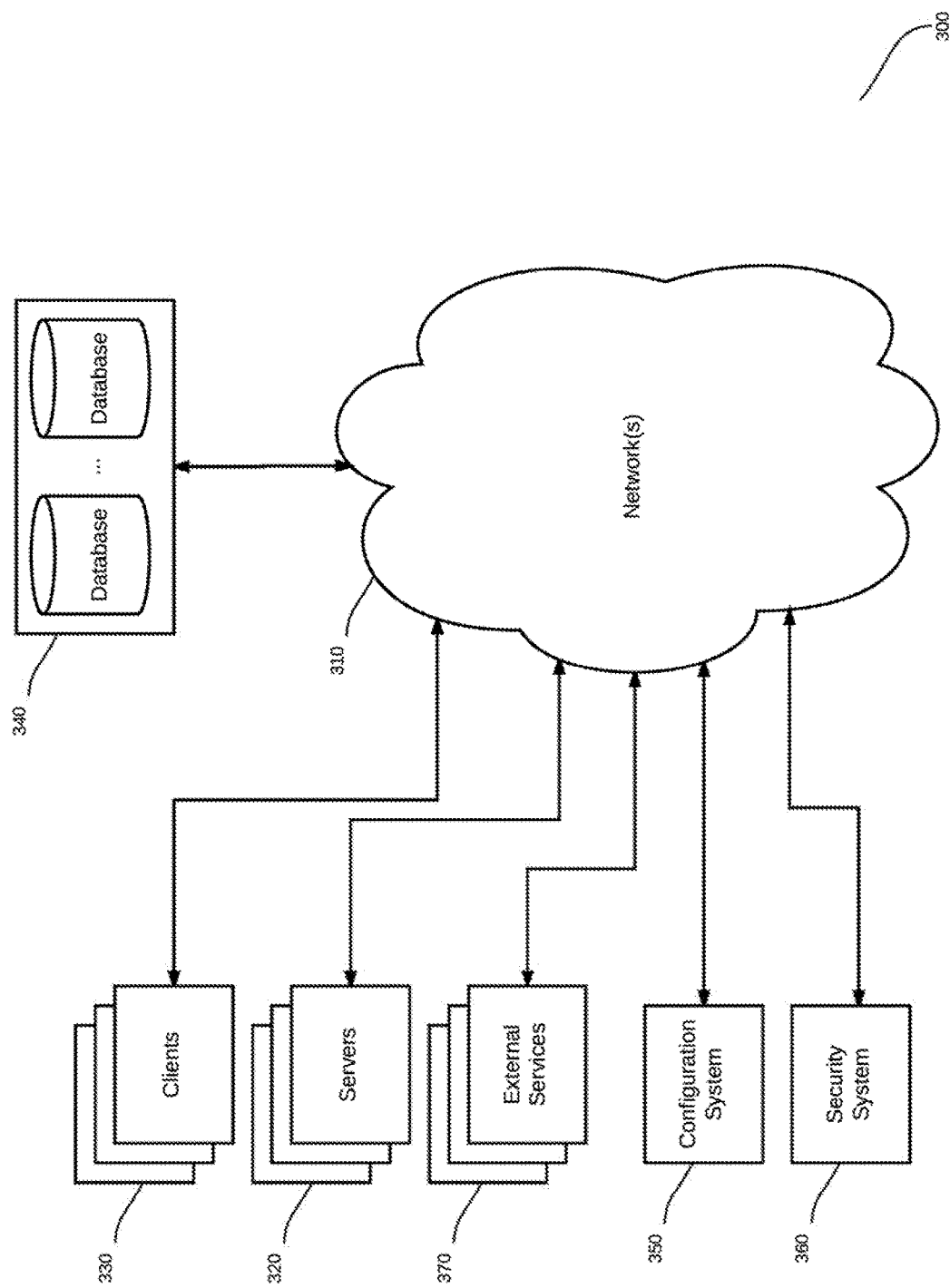
FIG. 10 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 10, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 9. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra™, Google Bigtable™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 11:
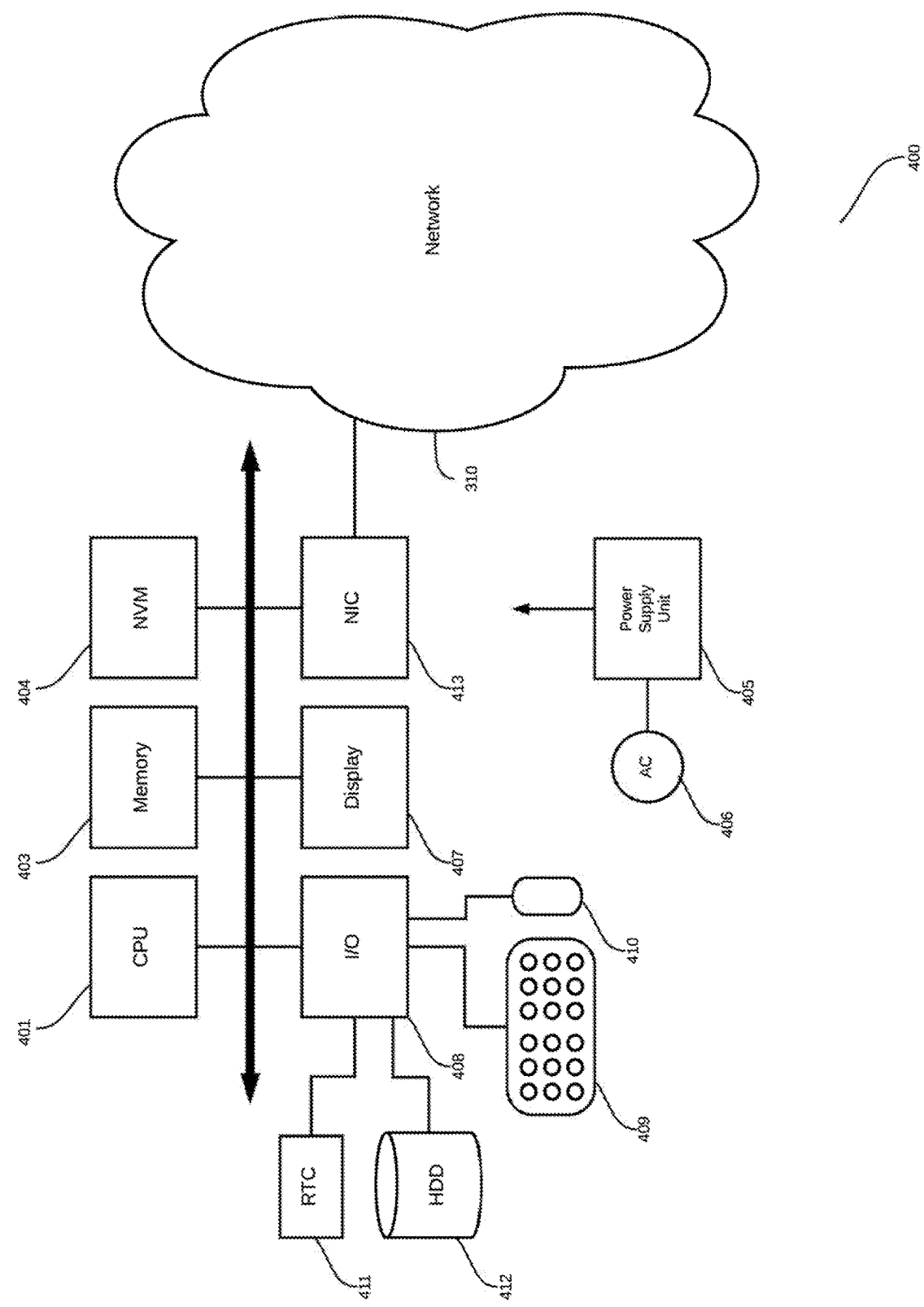
FIG. 11 is another block diagram illustrating an exemplary hardware architecture of a computing device used in various embodiments of the invention.

FIG. 11 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 12:
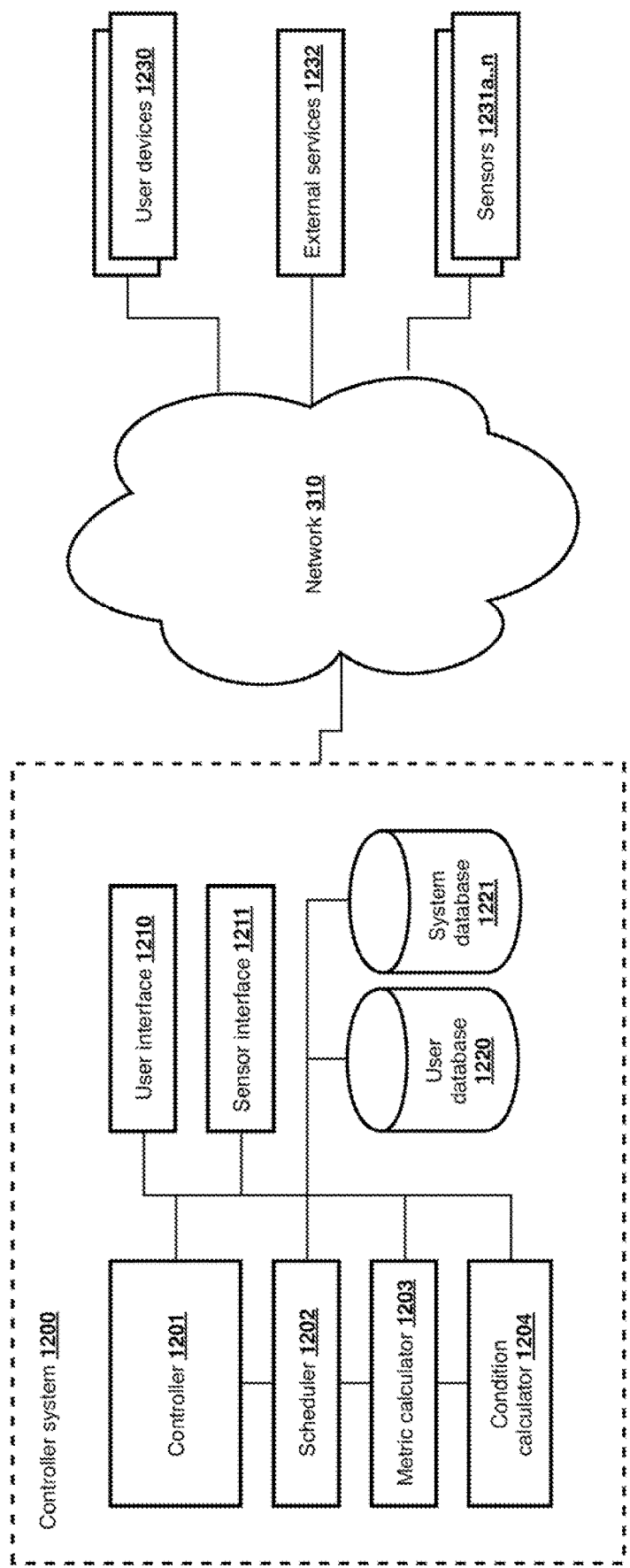
FIG. 12 is block diagram illustrating a system architecture for programmatic control of a compact motorized, height-adjustable desktop for a motorized standing desk converter, according to an embodiment of the invention.

FIG. 12 is block diagram illustrating a system architecture for programmatic control of a compact motorized, height-adjustable desktop for a motorized standing desk converter, according to a preferred embodiment of the invention. According to the embodiment, controller system 1200 comprises one or more processors 401, memory 403, and programming instructions, the programming instructions, when executed by the one or more processors 401, cause the processor to control movement of actuator 8, perform system calculations described herein, interact with users and user devices 1230, and other functions.

Controller system 1200 further comprises controller 1201 comprising programming instructions that perform system control based on communication, via network 310, to one or more sensor inputs from one or more sensors 1231a . . . n via sensor interface 1211. In some embodiments, communication is handled through sensor interface 1211 to manage sensor specific protocols. controller 1201 further communications with one or more user devices 1230 to receive system command. requests, and other input from users of system 1200.

Controller system 1200 further comprises scheduler 1202 comprising programming instructions that may perform scheduled system events such as reading sensor input on a schedule or performing requests such as movement of actuator 8 on a pre-defined or dynamic schedule (for example, based on data received from one or more sensors 1231a . . . n). In some embodiments, scheduler 1202 is connected to an external data source via external services 1232 (for example to a calendar service such as Microsoft Outlook™ or Google Calendar™, and the like) to determine system scheduled such as work hours, sit/stand schedules, etc.

Controller system 1200 further comprises metric calculator 1203 comprising programming instructions that may perform data corrections such as considering elements from sensor readings (for example, objects, such as a chair, on a weight-sensing mat 1231a, position of subjects in data from ultrasonic sensor 1231b, and the like) in order to more accurately calculate user metrics such as weight, standing/seated position, and the like.

Controller system 1200 further comprises condition calculator 1204 comprising programming instructions that may use preconfigured or dynamic data to determine a user's condition. Condition calculator may use sensor information from one or more sensors 1231a . . . n (for example, a glucose meter 1231c, a body mass indicator sensor 1231d, power meter 1231e, oxygen meter 1231f, etc.) individually, or in combination to establish a user's physical or health condition. in some embodiments, condition calculator may interface to network-connected health application such as Apple™ Health or other fitness and health applications on, for example, a user device 1230 or from a web service via external services 1232.

Controller system 1200 further comprises user interface 1210 comprising programming instructions to interface with one or more user devices 1230. User devices may be a computing device mounted to assembly 5 or may be a mobile computing device such a s smart phone.

Controller system 1200 further comprises sensor interface 1211 comprising programming instructions to interface with one or more sensors 1231a . . . n. Sensors may comprise a weight-sensing mat 1231a, an ultrasonic sensor 1231b, a glucose meter 1231c, a body mass indicator sensor 1231d, power meter 1231e, oxygen meter 1231f, and the like. In some embodiments, at least a portion of sensors 1231a . . . n may be an Internet of things (IoT) device that provides application specific data, for example, an IoT device connected to piece of exercise equipment.

Controller system 1200 further comprises user database 1220 comprising programming instructions to store and organize user data for metric and condition computations as well as for historical review by a user. It should be appreciated that user data may be stored in profiles whereby a profile may exist for each user and/or user device 1230 associated to system 1200. User database 1220 may comprise pre-configurations that are preferences (for example stored positions of actuator 8, and sit/stand schedules for particular users of system 1200). in some embodiments, user database 1220 may hold: personal information such as name, email address, phone, avatar, Twitter™ handle, and the like; login credentials such as username, password, third-party authorization tokens, and the like.

Controller system 1200 further comprises system database 1221 comprising programming instructions to hold system preferences and settings. System database 1221 may further hold configurations for sensors 1231*a* . . . *n* including device capability and paring information.

Figure 13:
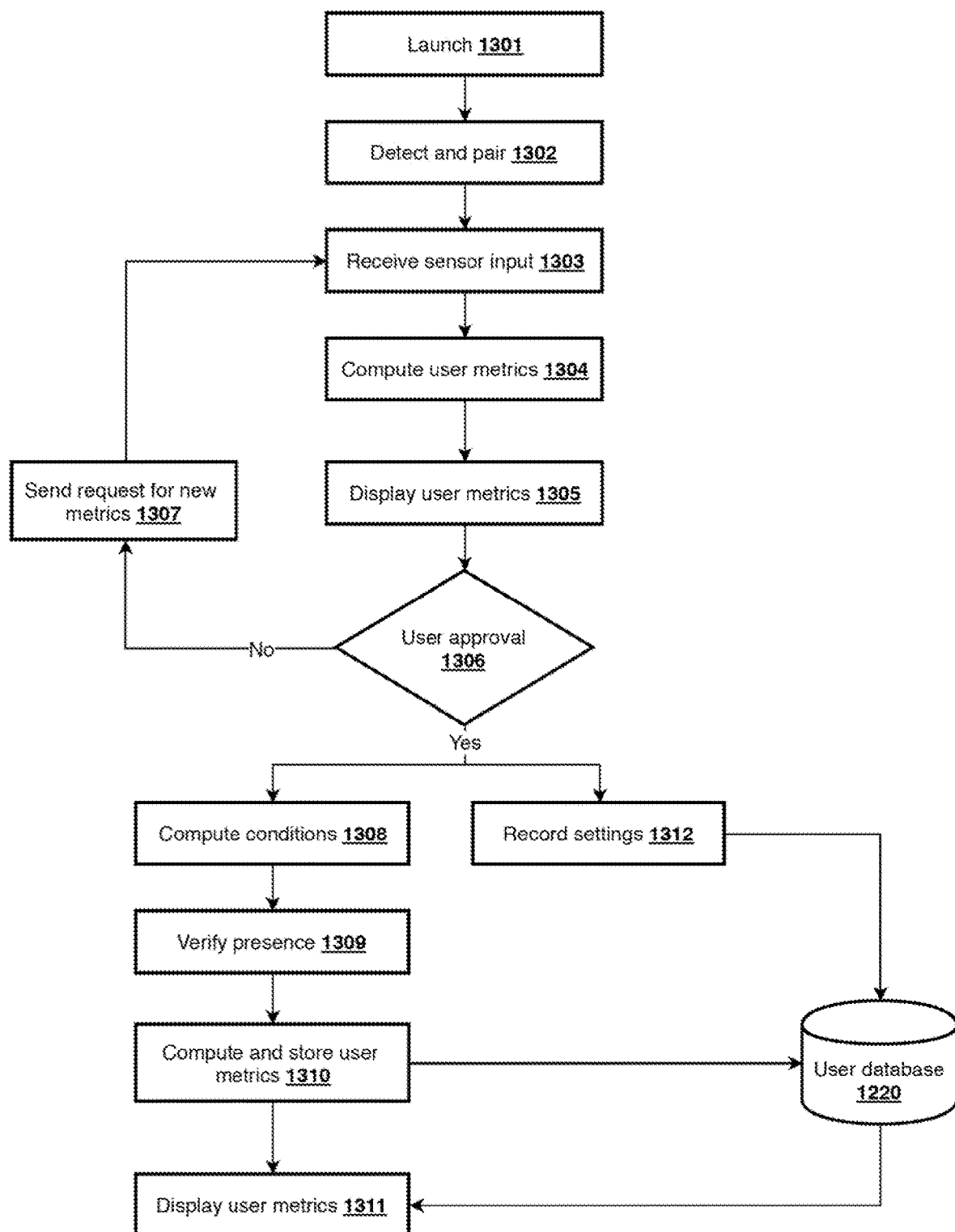
FIG. 13 is flow diagram illustrating a method for processing sensor inputs for a compact motorized, height-adjustable desktop for a motorized standing desk converter, according to an embodiment of the invention.

FIG. 13 is flow diagram illustrating a method for processing sensor inputs for a compact motorized, height-adjustable desktop for a motorized standing desk converter, according to a preferred embodiment of the invention. According to the embodiment, in a first step 1301, system 1200 may launch based on receiving user input from user interface 1210 or based on a scheduled start from scheduler 1202. In a next step 1302, controller 1201, detects one or more sensors 1231 via sensor interface 1211 and initiates a paring sequence to receive sensor settings, information, and share resources. A trusted relationship may be established between sensors 1231 and controller 1201, via sensor interface 1211 by using, for example, a numerical password, commonly referred to as a passkey. In some embodiments, a preconfigured passkey, for example, stored in system database 1221 and used to connect to sensors that may have been previously configured. In some embodiments, a new sensor may be detected, and a pairing sequence is started by sensor interface 1211.

In a next step 1303, sensor data may be received by controller 1201, via sensor interface 1211, such as: weight from a weight sensor 1231*a* (for example, from weight sensing or pressure sensing floor mat); computed height of a user from an ultrasound or ultrasonic sensor 1231*b* via sensor interface 1211. It should be appreciated by one with ordinary skill in the art that ultrasonic sensors are based on measuring the properties of sound waves with, for example, frequency above the human audible range. They are based primarily on three physical principles: time of flight, the Doppler effect, and the attenuation of sound waves. Ultrasonic sensors are non-intrusive in that they do not require physical contact with a user and can detect information automatically and electronically. In some embodiments, sensor data may be received from a plurality of sensors such as temperature, humidity, and the like.

In a next step 1304, computations may be made by metric calculator 1203 to consider additional items that may have been sensed by sensors 1231*a* . . . *n* (for example, a chair present on the weight-sensing mat) in computing user metrics, for example, a weight of the chair may be subtracted, by metric calculator 2103, in order to accurately represent a user's weight. In some embodiments, metric calculator 1203 may be used to correct for user height based on a perceived sitting of standing position from the ultrasonic sensor 1231*b*.

In a next step 1305, sensor data may be displayed on output device 260 (such as, display monitor 9) for user review of, for example, metric data whereby user approval may be solicited. In a next step 1306, an indication of user approval may be received, by controller 1201, via user interface 1210, comprising an approval (or, alternatively an indication not approving) the data sensed by the sensors (for example, weight from a weight sensor, height computer by an ultrasonic sensor, or other sensor readings).

If data received by controller 1201 indicates that a user has not approved the sensor metrics, in a next step 1307, a request may be sent to a user to, for example, request to re-establish one or more actions to re-engage a sensor 1231*a* . . . *n*, for example, to step off and step on again weight sensor 1231*a*. Processing returns to step 1303 to receive a new set of sensor data from one or more sensors 1231*a* . . . *n*.

Alternatively, if an indication of approval is received in step 1306, in a next step 1308, one or more conditions may be computed by condition calculator 1204, for example, calculate a user's physical condition based on a pre-configured set of rules from user database 1220 to determine one or more sit and stand periods for the user. Further, once an indication of approval is received in step 1306, step 1312 may record sensor data to user database 1220.

In a next step 1309, controller 1201 may request, via sensor interface 1211, for an indication of user presence, for example, by an affirmative weight sensed on weight sensor 1231*a*, or, in some embodiments, from a positive reading from ultrasonic sensor 1231*b*, or the like. In a next step 1310, sensor reading may be stored to user database 1220. In a next step 1311, user metrics and computed conditions may be displayed on output device 260 (for example, display monitor 9)

It should be noted that in some embodiments, system 1200 and a first user device 1230 may execute on the same hardware (i.e. they are the same device). in other embodiments, they may be more than one device with components 1201-1221 executing on different computing hardware.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The skilled person will be aware of a range of possible modifications of the various embodiments described above. Accordingly, the present invention is defined by the claims and their equivalents.

What is claimed is:

1. A system to automatically direct a height-adjustable desk, the system comprising:
   a network connected controller computer comprising a memory, a processor, and a plurality of programming instructions stored in the memory, the plurality of programming instructions, when executed by the processor, cause the processor to:
   display data from one or more sensors, the data comprising measurements related to height, weight, and presence of a user of the height-adjustable desk;
   responsive to receiving approval from the user for the displayed data, calculate a physical condition profile for the user, wherein the physical condition profile is computed based on inputs received from a network-connected health application and approved data, wherein the inputs received from the network-connected health application are physiological parameters associated with the user;
   create a sit and stand schedule for the user based on the calculated physical condition profile; and
   transmit a signal to an electric motor associated with the height-adjustable desk based on the sit and stand schedule.

2. The system of claim 1, wherein the plurality of programming instructions, when further executed by the processor, cause the processor to receive, from the one or more sensors, data indicative of a detected presence of the user.

3. The system of claim 1, wherein the plurality of programming instructions, when further executed by the processor, cause the processor to receive, from the one or more sensors, data indicative of detected changes in a position, weight distribution, and movement of the user.

4. The system of claim 1, wherein the plurality of programming instructions, when further executed by the processor, cause the processor to receive, from the one or more sensors, a detected weight, and a height associated with the user.

5. The system of claim 1, wherein the programming instructions when executed by the processor further cause the processor to connect to an external data source.

6. The system of claim 5, wherein the programming instructions when executed by the processor further cause the processor to receive calendar information of the user from the external data source, wherein the external data source is a calendar service.

7. The system of claim 1, wherein the programming instructions when executed by the processor further cause the processor to transmit the physical condition profile to the network-connected health application.

8. The system of claim 1, wherein the programming instructions when executed by the processor further cause the processor to store, in a database associated with an online health service, the one or more sit and stand periods for the user.

9. The system of claim 1, wherein the programming instructions when executed by the processor further cause the processor to transmit a signal to a switch control assembly for adjusting the height of the height-adjustable desktop, wherein the adjustment is based on a pre-defined height defined by the user.

10. The system of claim 1, wherein the programming instructions when executed by the processor further cause the processor to transmit a signal to the electric motor resulting in adjustment of a peripheral tray housed within the height-adjustable desk, wherein the peripheral tray includes a flat upper surface and is attached to a moveable bracket.

11. The system of claim 10, wherein the adjustment of the peripheral tray results in adjustment in position of one or more computer monitors attached to the moveable bracket.

12. A computer-implemented method for automatically directing a height-adjustable desk, the method comprising:

receiving data, by a controller computer, from one or more sensors comprising measurements related to height, weight and presence of a user of the height-adjustable desk;

responsive to receiving an approval from the user for the displayed data, calculating, by the controller computer, a physical condition profile for the user, wherein the physical condition profile is computed based on inputs received from a network-connected health application and approved data, wherein the inputs received from the network connected health application are physiological parameters associated with the user;

creating, by the controller computer, a sit and stand schedule for the user based on the calculated physical condition profile; and transmitting, by the controller computer, a signal to an electric motor connected to the height-adjustable desk.

13. The method of claim 12, wherein the data is indicative of a detected presence of the user.

14. The method of claim 13, wherein the one or more sensors detect a weight and a height associated with the position of the user.

15. The method of claim 12, further comprising connecting, by the controller computer, to an external data source.

16. The method of claim 12, further comprising receiving, by the controller computer, calendar information of the user, wherein the external data source is a calendar service.

17. The method of claim 12, further comprising transmitting, by the controller computer, the physical condition profile to the network-connected health application.

18. The method of claim 12, further comprising storing, by the controller computer, in a database associated with an online health service, the one or more sit and stand periods for the user.

19. The method of claim 12, further comprising transmitting, by the controller computer, a signal to the electric motor for adjusting a peripheral tray housed within the height-adjustable desk, wherein the peripheral tray includes a flat upper surface and attached to a moveable bracket.

20. The method of claim 19, wherein adjusting the peripheral tray further comprises adjusting the peripheral tray to alter a position of one or more computer monitors attached to the moveable bracket.

* * * * *